2,847,470
Patented Aug. 12, 1958

2,847,470

MANUFACTURE OF HALOCARBONYLS

Merton H. Douthitt, Ossining, N. Y., assignor to The Texas Company, New York, N. Y., a corporation of Delaware No Drawing. Application November 23, 1955
Serial No. 548,776

4 Claims. (Cl. 260—544)

This invention relates to manufacture of halocarbonyls from carbon monoxide and a halogen capable of union therewith in the presence of activated carbon catalyst, and more particularly to manufacture of carbonyl bromide and phosgene.

Conventionally phosgene, which has use as a toxic gas and in chemical synthesis with alcohols to make chlorocarbonates and dialkyl carbonates, is made by reacting practically pure CO or producer gas containing about 25 volume percent CO with chlorine over activated charcoal catalyst. Elevated pressure can be used if desired in the reaction.

Heretofore, to prevent substantial formation of by-product hydrogen halides, it has been thought necessary to restrict hydrogen content of the input gas to insignificant amounts, e. g., below about 5% and preferably to zero, particularly where the halocarbonyl reaction is being conducted above 50° C. (122° F.) and more especially where reaction temperature reaches as high as 90° C. (194° F.).

I have now found that the formation of the halocarbonyl proceeds cleanly without noticeable formation of by-product hydrogen halide and at good rate at comparatively high temperature in the presence of substantial quantities of hydrogen, providing that the gas feed to the reactor is maintained at dryness (water content) below about 0.25 mg. per liter (gas volume measured at 760 mm. Hg pressure and 25° C.). My process for producing the halocarbonyl comprises: passing a mixture of synthesis gas containing hydrogen and carbon monoxide in the ratio of about 0.8–2 mols of hydrogen per mol of CO and having water content below 0.25 mg. per liter and a halogen having water content below 0.25 mg. per liter in the ratio of 0.8–0.99 mol of halogen per mol of carbon monoxide in said synthesis gas into contact with particulate carbonaceous catalyst in a reaction zone; establishing and maintaining gas phase conditions at temperature of said mixture in said reaction zone between about 160° and about 300° F. until practically all the halogen fed has been reacted with the carbon monoxide; and withdrawing gasiform products containing halocarbonyl from said reaction zone.

The critical moisture content of the gas fed to my process not only appears to suppress any significant side reaction of the hydrogen with the halogen, but also quite unexpectedly, prolongs the catalyst activity so that it can be used for indefinitely long periods measured in terms of years rather than months. The comparatively high temperatures possible for use in my process permit rather simple and economical cooling of the reactor for this exothermal reaction. Preferably the halogen charged to the reaction zone is chlorine to make phosgene product. If a little chlorine is adsorbed on the catalyst preparatory to its initial use a dangerously high temperature rise in the catalyst beds can be avoided.

To maintain flow conditions for the reaction and prevent possible coating of the catalyst pores it is essential that gas phase conditions be maintained in the reaction zone. The temperatures used in my process permit use of relatively high pressure operation without condensing halocarbonyl being formed. Broadly the temperature used can be as low as about 160° F. and as high as about 300° F. Structural limitations and safety considerations render the use of higher temperatures less desirable. Preferably, temperature of the operation is maintained between about 200° and about 260° F. and the pressure in the reaction zone is superatmospheric, e. g., 20 to 500 p. s. i. g.

Partial oxidation of pulverized coal, liquid hydrocarbon and/or natural gas with oxygen, or reaction of methane and steam produces a mixture of carbon monoxide and hydrogen eminently suitable for use in my process. Ordinarily such gas feeds are called "synthesis gases" and will be so referred to herein. They can contain between about 0.8 and 2 mols of hydrogen per mol of carbon monoxide and, on a dry basis, have insignificant quantities of other materials in them. Any carbon in such gases ordinarily is removed sufficiently by water washing. They can be dried to the critical moisture level necessary for my process by use of silica gel, glycol, activated alumina or other conventional means. The halogen, e. g., chlorine can be purchased with water content well below the critical figure so that, in the ordinary case, moisture of the synthesis gas need alone be carefully regulated.

I have found it convenient to correlate "dew point" of a small sample stream of the synthesis gas with moisture content, the dew point being measured simply by passing the gas sample over a chilled mirror and observing the temperature at which fogging of the mirror occurs due to ice or moisture precipitation. The critical dew point so obtained is below minus 25° F. In a commercial installation the gas can be dried to dew point of about minus 70° F. at comparatively low cost. Preferably, I maintain dew point of the input synthesis gas to the reactor between about minus 30 and minus 70° F. corresponding to absolute water content between about 0.2 and 0.01 mg. per liter. The limiting water content in the gas for use in my invention is somewhat below that which can be obtained using fused calcium chloride or 95% sulfuric acid as the dehydrating agent.

For efficiency and economy in the practice of my process I prefer to use synthesis gas generated by partial oxidation of natural gas with oxygen, said synthesis gas having between about 1.4 and 1.8 mols of hydrogen per mol of carbon monoxide. To consume practically all if not the entire quantity of halogen fed to the reactor it is necessary to use slightly less halogen than carbon monoxide, e. g., 0.8–0.99 mol of halogen per mol of carbon monoxide and preferably, in the case of phosgene manufacture, between about 0.9 and 0.97 mol of chlorine per mol of carbon monoxide. The reactor system can be made of steel but is preferably made of lead-lined steel.

The operation of my process will be clear from the following example: gas flows are given in standard cubic feet per hour measured at 60° F. and 760 mm. Hg. All temperatures are given in degrees Fahrenheit and all gas compositions in volume percent.

Example

Air is rectified in a commercial oxygen plant to produce an oxygen stream of 95% purity and nitrogen of 99.7% purity. The oxygen is supplied at 295° F. to a flow-type synthesis gas generator of the type disclosed in U. S. Patent 2,582,938, to Du Bois Eastman and Leon P. Gaucher. Natural gas of the following composition is heated to 915° F. and supplied to the generator.

| Component: | Percent |
|---|---|
| Methane | 87.1 |
| Ethane | 7.9 |
| Propane and heavier | 2.0 |
| Nitrogen | 1.9 |
| Carbon dioxide | 1.1 |

The natural gas and oxygen streams are introduced separately into the generator and mixed within the generator which is a closed, compact, unpacked reactor with an internal volume of 33 cubic feet and small amount of internal surface relative to its volume. The generator is operated at a pressure of 300 p. s. i. g. A generator temperature of 2600° F. is autogenously maintained by the reaction between the oxygen and the natural gas. Feed rate of the natural gas is 59,950 S. C. F. H. (standard cubic feet per hour), and feed rate of the oxygen is 41,150 S. C. F. H. The product synthesis gas on a water free basis has the following composition:

| Component: | Volume percent |
|---|---|
| Carbon monoxide | 36.0 |
| Hydrogen | 59.8 |
| Carbon dioxide | 2.0 |
| Methane | 0.2 |
| Nitrogen | 2.0 |

The synthesis gas is scrubbed and quenched with water to temperature of about 300° F. A side stream of 5000 S. C. F. H. of this synthesis gas is withdrawn from the scrubber exit, further cooled to about 100° F., and passed through a 15 cubic foot bed of silica gel to obtain dew point at atmospheric pressure of minus 50° F. (about 0.05 mg. water per liter measured at 25° C. and one atmosphere). Thus dried, the synthesis gas stream at pressure of about 290 p. s. i. g. is mixed with chlorine flowing at the rate of 3160 pounds per hour. This mixture is passed from bottom to top of three sets of water-cooled, lead-lined steel tubes containing a total of about 15 cubic feet of 6–8 mesh grade SXW Columbia activated carbon catalyst (vegetable carbon) previously pre-treated at atmospheric pressure with a small amount of chlorine. The sets are arranged in series flow, and each tube of a set is in parallel flow of others of its set. Gas temperature in the tubes of the first set averages about 230°, and ranges to 295° at the outlet of the second set down to 200° at the outlet of the third set. Composition of the outlet gas being withdrawn from the third set is as follows:

| Phosgene | 33.9 |
|---|---|
| Carbon monoxide | 2.2 |
| Hydrogen | 59.9 |
| Carbon dioxide | 2.0 |
| Nitrogen | 2.0 |
| Methane | Trace |

About 90% of the phosgene can be separated from the outlet gas stream by indirect cooling to temperature of about 78% F. Further cooling and/or compression of the exit gas can be used to remove practically all of the phosgene product from the outlet gas. The balance of the gas can be scrubbed with aqueous caustic soda or other neutralizing agent to remove phosgene traces, then recycled to the synthesis gas generator or used for other purposes.

Obviously, many modifications and variations of the invention, as hereinbefore set forth, may be made without departing from the spirit and scope thereof, and therefore only such limitations should be imposed as are indicated in the appended claims.

I claim:

1. A process for producing a phosgene which comprises: passing a mixture of synthesis gas containing hydrogen and carbon monoxide in the ratio of about 0.8–2 mols of $H_2$ per mol of CO, not more than about 5 percent of carbon dioxide, nitrogen, and methane, and having water content below 0.25 mg. per liter and chlorine having water content below 0.25 mg. per liter in the ratio of 0.8–0.99 mol of chlorine per mol of carbon monoxide in said synthesis gas into contact with particulate activated carbon catalyst in a reaction zone; establishing and maintaining gas phase conditions at temperature of said mixture in said reaction zone between about 160° and about 300° F. until practically all of the chlorine fed has been reacted with the carbon monoxide; and withdrawing a gasiform product containing phosgene from said reaction zone.

2. The process of claim 1 wherein said temperature is maintained between about 200 and 260° F., the pressure in said reaction zone is between 20 and 50 p. s. i. g., the water content of said synthesis gas is between about 0.2 and 0.01 mg. per liter, and mol ratio of chlorine to carbon monoxide fed is 0.9–0.97 mol chlorine per mol of carbon monoxide.

3. The process of claim 1 wherein said synthesis gas consists essentially of about 1.4 to 1.8 mols of hydrogen per mol of carbon monoxide.

4. A process for producing phosgene which comprises passing a mixture of synthesis gas containing hydrogen and carbon monoxide in the ratio of about 0.8 to 2 mols of hydrogen per mol of carbon monoxide, not more than about 0.2 percent methane, and having a water content below 0.25 mg. per liter and chlorine having a water content below 0.25 mg. per liter in the ratio of 0.8 to 0.99 mol of chlorine per mol of carbon monoxide in said synthesis gas into contact with particulate activated carbon catalyst in a reaction zone; establishing and maintaining gas phase conditions at a temperature of said mixture in said reaction zone between about 160° and about 300° F. until practically all of the chlorine fed has been reacted with the carbon monoxide; and withdrawing a gasiform product containing phosgene from said reaction zone.

References Cited in the file of this patent

FOREIGN PATENTS 583,477 Great Britain _____ Dec. 19, 1946

OTHER REFERENCES

Rose: The Condensed Chemical Dictionary, p. 546, 4th ed., 1950, Reinhold Pub. Co.

UNITED STATES PATENT OFFICE
CERTIFICATE OF CORRECTION

Patent No. 2,847,470                      August 12, 1958

Merton H. Douthitt

It is hereby certified that error appears in the above numbered patent requiring correction and that the said Letters Patent should read as corrected below.

Column 4, line 29, for "50" read -- 500 --.

Signed and sealed this 10th day of September 1963.

(SEAL)
Attest:

ERNEST W. SWIDER
Attesting Officer

DAVID L. LADD
Commissioner of Patents